(12) United States Patent
Ries

(10) Patent No.: US 8,627,843 B2
(45) Date of Patent: Jan. 14, 2014

(54) GATE VALVE ASSEMBLY FOR INSTALLATION IN PRESSURIZED PIPES

(75) Inventor: Brian J. Ries, Oak Park, IL (US)

(73) Assignee: ADS LLC, Huntsville, AL (US)

(*) Notice: Subject to any disclaimer, the term of this patent is extended or adjusted under 35 U.S.C. 154(b) by 0 days.

(21) Appl. No.: 13/486,737

(22) Filed: Jun. 1, 2012

(65) Prior Publication Data
US 2013/0319542 A1  Dec. 5, 2013

(51) Int. Cl.
*F16L 55/18* (2006.01)
(52) U.S. Cl.
USPC ........................ 137/318; 137/315.29; 251/193
(58) Field of Classification Search
USPC .............. 137/15.14, 15.23, 315.29, 317, 318; 251/175, 193, 326, 327
See application file for complete search history.

(56) References Cited

U.S. PATENT DOCUMENTS

| | | | | |
|---|---|---|---|---|
| 3,799,182 A * | 3/1974 | Long | ........................... | 137/15.17 |
| 3,948,282 A * | 4/1976 | Yano | ........................... | 137/15.17 |
| 5,074,526 A * | 12/1991 | Ragsdale et al. | .............. | 251/267 |
| 6,357,471 B1 * | 3/2002 | Sato et al. | ....................... | 137/318 |
| 6,810,903 B1 | 11/2004 | Murphy et al. | | |
| 6,983,759 B2 * | 1/2006 | Maichel et al. | .......... | 137/315.41 |
| 7,819,384 B2 * | 10/2010 | Nakano et al. | ................ | 251/204 |
| 2004/0222399 A1 * | 11/2004 | Maichel et al. | ................ | 251/326 |

* cited by examiner

*Primary Examiner* — John K Fristoe, Jr.
*Assistant Examiner* — Reinaldo Sanchez-Medina
(74) *Attorney, Agent, or Firm* — Miller, Matthias & Hull LLP

(57) ABSTRACT

A gate valve is disclosed that may be installed in a pressurized pipe or conduit. The gate valve includes a cylindrical gate housing that has a slot through which a rectangular gate slides between an open and closed position. The gate and gate housing provide seals between the gate valve and the housing section that houses the gate housing when the gate valve is in either an open or a closed position. The bottom seal that engages the pressurized pipe may be equipped with stiffening shields for a higher pressure rating. The operating torque to raise and lower the seal assembly has been substantially reduced by the design of the sliding gate within the gate housing.

20 Claims, 8 Drawing Sheets

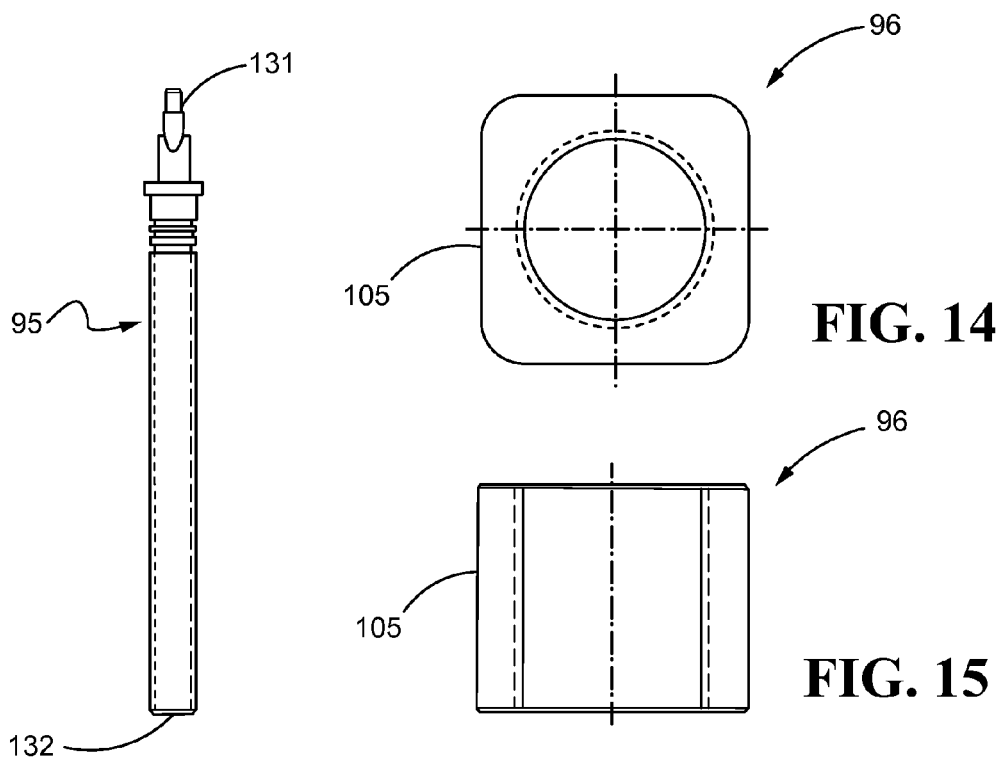
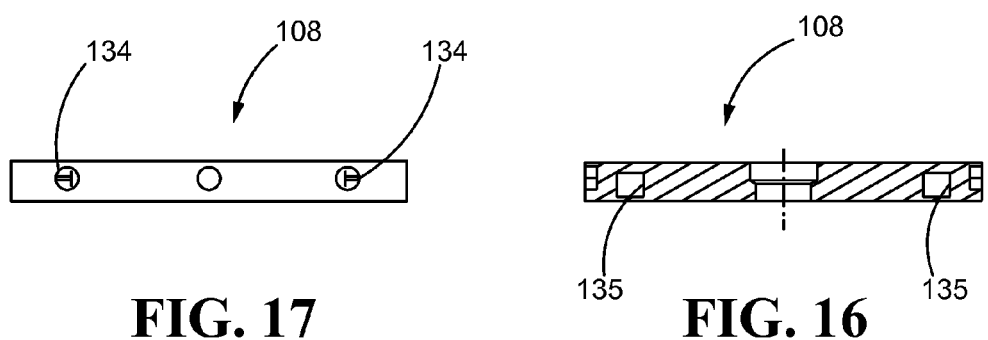

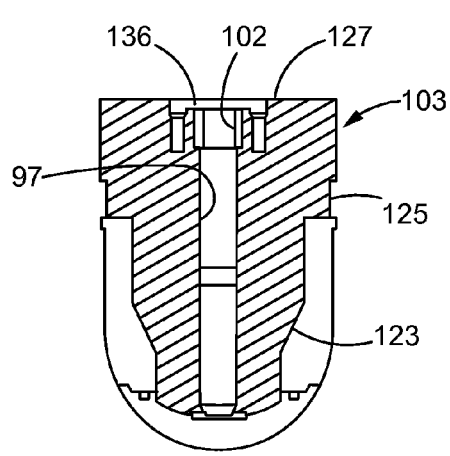
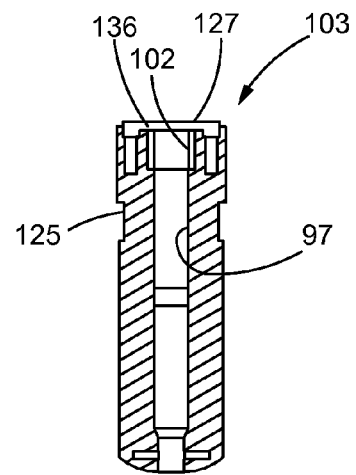
FIG. 18  FIG. 19
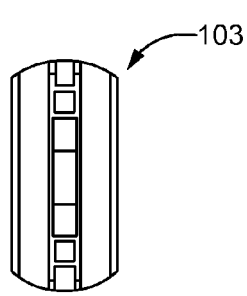
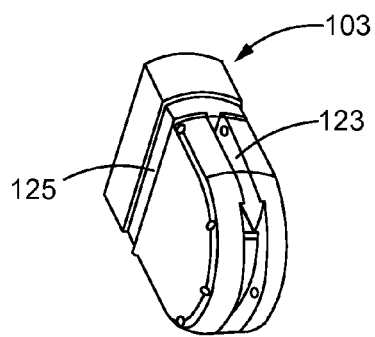
FIG. 20  FIG. 21
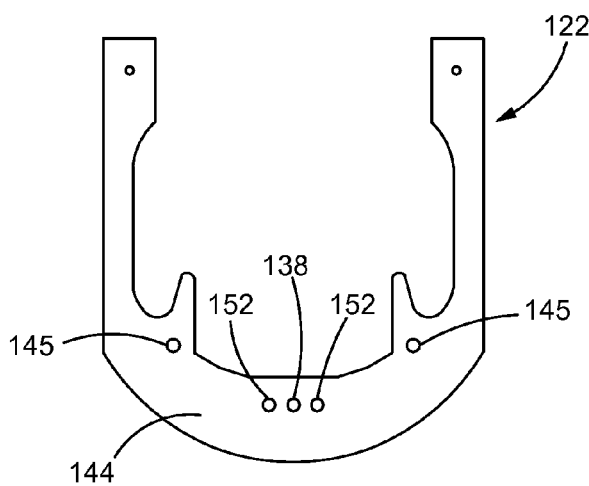
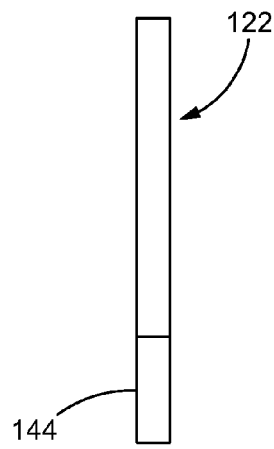
FIG. 22  FIG. 23

GATE VALVE ASSEMBLY FOR INSTALLATION IN PRESSURIZED PIPES

BACKGROUND

1. Technical Field

This disclosure relates generally to valves for shutting off flow in a pressurized pipe or conduit. More specifically, this disclosure relates to valves that may be installed in a pressurized pipe without shutting off flow to the pipe while the valve is being installed. Still more specifically, this disclosure relates to improvements in the design of a gate valve assembly which increases the pressure rating of the valve and decreases the operating torque required to open and close the valve.

2. Description of the Related Art

Pressurized conduit or pipe systems convey fluids, both liquid and gas, in municipalities, industrial plants, and commercial installations. When originally installed, these conduit systems include certain block valves that may be closed to isolate sections of the pipe for repairs, relocation, or installation of new components into the pipe. When a shutdown is required in a municipal water distribution system, a large area may be deprived of water service. Accordingly, schools, hospitals, commercial and/or industrial facilities may have to be shut down in addition to the inconvenience to residents.

The total length of pipe to be isolated can be greatly shortened by adding additional valves, in conjunction with the preexisting block valves. The additional valves may be of the form that can be installed in a pressurized pipe or conduit without service interruption and with minimal fluid loss. Upon closure of the added valve and completion of the work on the depressurized damaged section of the pipe, the additional valve may be opened or retracted and the block valves are opened, thereby restoring flow through the repaired section of pipe. The additional valves are known in the art under a variety of names, such as a conduit stopper, line stop, conduit line plugger, inserting valve, add-on valve, insertable stopper valve, etc. One example can be found in the commonly assigned U.S. Pat. No. 6,810,903.

Typically, such valves include a chamber or housing disposed adjacent to and communicating with the pressurized conduit. In most cases the chamber is typically rectangular and may be assembled perpendicular and pressure-tight to the outside of the conduit as shown in FIG. 1 of the '903 patent. Communication is established by a process called pressure tapping. This process is well known in prior art, and utilizes a temporary valve, such as a knife valve, to allow the cutting or drilling devices and the new valve to be mounted to the pipe without significant loss of fluid pressure or fluid flow.

After the pipe is cut, the additional valve can then be passed through the temporary valve into the chamber, where it may be held until the pipe needs to be closed. To stop flow, the valve body is then moved from the chamber into the pipe.

Many of the valves added to municipal pipe systems are intended for temporary service, often in emergency situations. However, other additional valves are designed for permanent installation into a pressurized pipe. Each permanent valve is provided with an internal jackscrew-type actuator that allows the valve to be operated as a conventional block valve that is opened and closed by a worker by merely turning a handle or a valve wrench. This type of permanent valve can be used in emergencies in the same manner as a temporary valve and then abandoned.

At least two problems are associated with the currently available valves that may be installed in pressurized pipes. First, the types of valves that utilize a jackscrew actuator may have limited pressure ratings because the pressure applied to the valve body (e.g., a gate or block) is imposed on the jackscrew as rotation of the jackscrew results in the raising or lowering of the valve body. The forces applied to the jackscrew and the valve body are perpendicular to the axis of the jackscrew because the axis of the jackscrew and the axis of the pressurized pipe are perpendicular to each other. Thus, the perpendicular force imposed upon the valve body and jackscrew can cause seal leakage and therefore limit the pressure rating of the valve. A second problem associated with such additional valves added to pressurized pipes is the torque required to open and close the valves. Reducing the operating torque to open and close these types of valves would improve the safety of such operation and reduce the time, effort and costs of carrying out such operations.

Accordingly, improved valves that may be installed in pressurized pipes and conduits are needed.

SUMMARY OF THE DISCLOSURE

In satisfaction of the aforenoted needs, a gate valve is disclosed. The disclosed gate valve may include a cylindrical gate housing that may include a slot that extends through a bottom of the cylindrical gate housing and towards a top of cylindrical gate housing. The slot may be used to accommodate a seal assembly. The seal assembly may include a gate having a top and a bottom. The top of the gate may include a hole that passes through the top of the gate for receiving a feed screw. The hole may also include a shaped opening for loosely accommodating a stem nut. The feed screw may pass through and threadably engage the stem nut. The shaped opening may provide a gap between the gate and the stem nut but the shaped opening may also prevent rotation of the stem nut within the shaped opening. The top of the gate may be connected to a retention plate through which the feed screw passes. The retention plate may also at least partially cover the shaped opening for retaining the stem nut within the shaped opening. The bottom of the gate may include a groove for accommodating a seal. Therefore, rotation of the feed screw may cause extension of the seal assembly out of the slot and into the pressurized pipe or conduit or rotation of the feed screw may cause retraction of the seal assembly from the pipe back into the slot.

A kit is also disclosed for installing a gate valve to a pressurized pipe. The kit may include a gate valve housing that includes a base for engaging the pipe. The base may be connected to a proximal end of a housing section that extends at least substantially perpendicularly away from the pipe and that terminates at an open distal end. The kit may also include a temporary valve detachably connected to the distal end of the housing section of the gate valve housing. The kit may further include an installation housing having a proximal end that may be connected to the temporary valve opposite the distal end of the housing section. The installation housing may include an open distal end. The open distal end may be connected to a cover. The cover may include a central opening that sealably accommodates a shaft. The shaft may include a proximal end connected to a cylindrical cutting device and a distal end connected to an actuator. The gate valve may include a cylindrical gate housing that may include a slot extending through a bottom of the cylindrical gate housing that extends towards a top of the cylindrical gate housing. The slot may accommodate a seal assembly. The seal assembly may include a gate having a top and a bottom. The top of the gate may include a hole that passes through the top of the gate for receiving a feed screw. The hole may also include a shaped opening for loosely accommodating a stem nut. The feed screw may pass through and be threadably engaged with the stem nut. The shaped opening may provide a gap between the gate and the stem nut but the shaped opening may also prevent rotation of the stem nut within the shaped opening. The top of the gate may be connected to a retention plate through which the feed screw passes. The retention plate may also at least partially cover the shaped opening for retaining the stem nut within the shaped opening. The bottom of the gate may include a groove for accommodating a seal.

A method for installing a gate valve in a pressurized pipe is also disclosed. The disclosed method may include coupling a gate valve housing to the pipe. The gate valve housing may include a distal end. The method may further include coupling a temporary valve to the distal end of the gate valve housing. The method may then include coupling a proximal end of an installation housing to the temporary valve opposite the distal end of the gate valve housing. The installation housing may also include a distal end. The method may further include coupling a cylindrical cutting device to a proximal end of a shaft and passing a distal end of the shaft through a central opening of a cover and placing the cylindrical cutting device inside the installation housing. The method may then include coupling the cover to the distal end of the installation housing with the shaft passing through the central opening of the cover. The method may then include opening the temporary valve and moving the cylindrical cutting device into contact with the pipe and rotating the shaft and cylindrical cutting device and cutting an opening in the pipe. The method may then include retracting the cylindrical cutting device through the temporary valve and into the installation housing and closing the temporary valve. The method may then include removing the installation housing from the temporary valve and removing the cylindrical cutting device from the installation housing. The gate valve may include an shaft. The method may therefore also include passing the shaft through the central opening of the cover of the installation housing so the gate valve is disposed within the installation housing. The method may then include re-coupling the installation housing to the temporary valve, opening the temporary valve and passing the gate valve through the temporary valve into the gate valve housing which results in the gate valve sealably engaging the gate valve housing. The method may then include securing the gate valve to the gate valve housing in the correct orientation before removing the temporary valve and installation housing and coupling the cover plate to the distal end of the gate valve housing.

In any one or more of the embodiments described above, the gate may include a curved bottom and a flat top disposed between and connected to a pair of end walls. The groove that accommodates the seal may extend around the curved bottom and at least partially along each end wall.

In any one or more of the embodiments described above, the seal may include a bottom portion disposed between a pair of end portions. The bottom portion may extend beyond the bottom of the gate and the end portions may extend beyond the end walls when the seal is disposed in the groove.

In any one or more of the embodiments described above, the bottom portion of the seal is connected to at least one stiffening shield. In a further refinement of this concept, the bottom portion of the seal is sandwiched between a pair of shields.

In any one or more of the embodiments described above, the gate valve housing may further include a base for engaging the pipe. The base may be connected to a housing section that extends perpendicularly away from the pipe. The housing section may accommodate the gate valve when the seal assembly of the gate valve is retracted into the slot of the gate housing of the gate valve.

In any one or more of the embodiments described above, the cylindrical gate valve housing may include a circumferential seal to provide a seal between the gate valve housing and the housing section of the gate valve housing thereby enabling the temporary seal to be removed after the pressurized pipe has been cut and the gate valve has been moved into the housing portion of the gate valve housing.

In any one or more of the embodiments described above, the actuator for rotating the shaft connected to the cylindrical cutting device may be a motor. In a further refinement of this concept, the motor may be an air powered motor, an electric motor, a hydraulic motor or any other suitable actuator that may be used to rotate the shaft about its axis.

In any one or more of the embodiments described above, the actuator may be supported above the cover of the installation housing by a plurality of guide posts.

In any one or more of the embodiments described above, the temporary valve may be a knife gate valve.

In any one or more of the embodiments described above, a gate valve housing top plate may be provided for connection to the distal end of the housing section of the gate valve housing. The gate valve housing top plate may include an opening through which a portion of the feed screw may sealably pass to thereby enable an operator to open and close the valve after the installation is complete and without removing the gate valve housing top plate.

Other advantages and features will be apparent from the following detailed description when read in conjunction with the attached drawings.

BRIEF DESCRIPTION OF THE DRAWINGS

For a more complete understanding of the disclosed methods and apparatuses, reference should not be made to the embodiments illustrated in greater detail in the accompanying drawings, wherein:

FIG. 2 also illustrates an shaft and an actuator in the form of a motor used to rotate the shaft.

In FIG. 5, the cylindrical cutting device is ready to be drawn upwards through the temporary valve and into the installation housing.

FIG. 13 is a plan view of the feed screw illustrated in FIGS. 10-12.

FIGS. 14-15 are top and side views of the stem nut shown in FIGS. 10-12.

FIGS. 16-17 are sectional and side views respectively of the gate assembly top plate, which is shown in FIGS. 10-12.

FIGS. 18-21 are front sectional, end sectional, bottom and bottom perspective views of the gate valve shown in FIGS. 10-12.

FIGS. 22-23 are front and side views of the seal that is received in the groove that extends around the bottom and end wall portions of the gate illustrated in FIGS. 18-20.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments herein.

DETAILED DESCRIPTION OF THE PRESENTLY PREFERRED EMBODIMENTS

Figure 1:
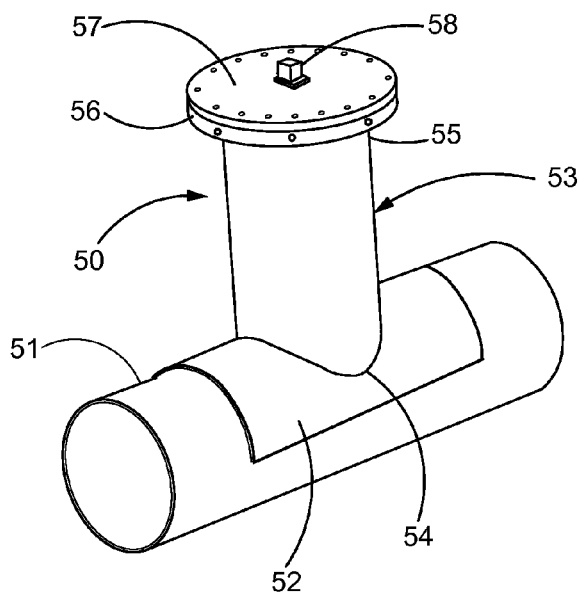
FIG. 1 is a perspective view of a disclosed gate valve housing and gate valve installed on a section of pipe.

FIG. 1 is a perspective view of a disclosed gate valve housing 50 mounted to a section of a pipe 51 that may be a pressurized pipe or conduit such as a municipal water main. Other applications for installing a valve to a pressurized pipe or conduit will be apparent to those skilled in the art and this disclosure in no way is limited to municipal applications. Those skilled in the art will be aware of industrial and commercial needs for installing a valve in a pressurized pipe or conduit without the need for depressurizing the pipe or conduit.

Still referring to FIG. 1, the gate valve housing 50 includes a base 52 connected to a housing section 53 having a proximal end 54 connected to the base 52 and a distal end 55 connected to a flange 56 which, in turn, may be coupled to a valve housing top plate 57. A operating nut 58 is also shown on top of the valve housing top plate 57. The operating nut 58 may be coupled to an actuator or, more precisely, a feed screw 95 (FIGS. 10-13) that is used for raising and lowering the gate valve 82 (FIG. 33) as described below.

Figure 2:
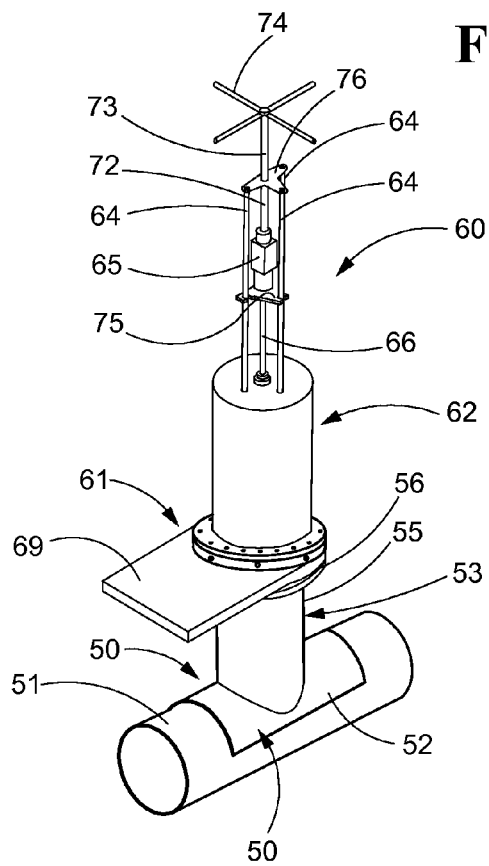
FIG. 2 is a perspective view of a gate valve housing and pipe shown in FIG. 1 during the installation process and further illustrating the temporary valve disposed between the housing section of the gate valve housing and an installation housing.
Figure 3:
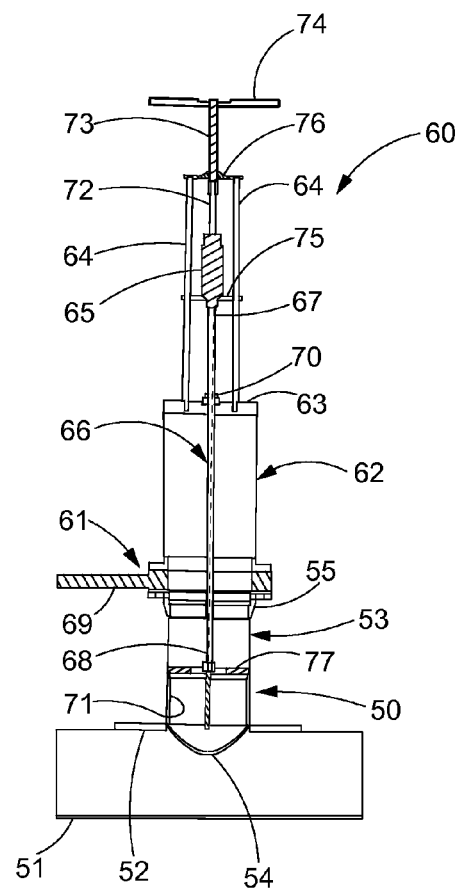
FIG. 3 is a sectional view of the assembly shown in FIG. 2 particularly illustrating the temporary valve in an open position with a cylindrical cutting device disposed in the housing portion of the gate valve housing and ready to cut a hole in the pipe, which is shown in a horizontal position.

Turning to FIGS. 2-3, an installation assembly 60 is disclosed. To install a gate valve 82 in a pressurized pipe 51 without depressurizing the pipe 51, the gate valve housing 50 is first installed on the pipe 51 by placing the base 52 on the pipe 51 and clamping the base 52 to the pipe 51 with straps, clamps or other devices that will be apparent to those skilled in the art that may be used to secure a tight fit and at least a partial seal between the base 52 and the pipe 51. Then, with the valve housing top plate 57 removed, a temporary valve 61 may be mounted on the flange 56 of the housing section 53. In the embodiment shown, the temporary valve 61 is a knife valve that features a slidable plate 69 that may be moved to the right from the perspective of FIG. 3 to block any flow from the housing section 53 to the installation housing 62.

The installation housing 62 is mounted on top of the temporary valve 61 as shown in FIGS. 2-3. The installation housing 62 also includes a cover 63 that contains any fluid within the installation housing 62 as described below. In FIGS. 2-3, the installation assembly 60 is being readied to cut a hole in the pipe 51. Specifically, a plurality of guide posts 64 are mounted on top of the cover 63. The guide posts 64 prevent rotational movement of the actuator 65 which may be a motor, such as an air motor, electric motor, hydraulic motor, etc. Other types of actuators 65 will be apparent to those skilled in the art. The actuator 65 is coupled to a mandrel or shaft 66 having a distal end 67 coupled to the actuator and a proximal end 68 coupled to a cylindrical cutting device 71. Using the actuator 65, the shaft 66 is rotated thereby rotating the cylindrical cutting device 71 to penetrate and cut a hole in the pipe 51 as shown in FIG. 4.

Still referring to FIG. 3, one or more shafts or extensions 72, 73 may be used to connect the actuator 65 to a handle 74. The actuator 65 may also be equipped with a plate 75 that engages the guide posts 64 to prevent rotation of the actuator 65. Further, a packing nut 70 may be used to seal a central opening in the cover 63 to prevent leakage. An additional combination plate/nut 76 may be used to stabilize the guide posts 64 as well as the extension shafts 72, 73. Further, the cylindrical cutting device 71 may be coupled to a centering ring 77 to ensure that the cut made by the cylindrical cutting device 71 is in alignment with the inside diameter of the housing section 53 and as illustrated in FIG. 4.

Figure 4:
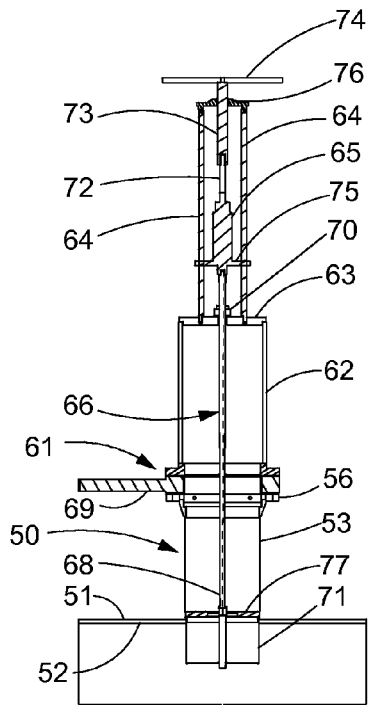
FIG. 4 is another illustration of the assembly shown in FIGS. 2 and 3 with the cylindrical cutting device having cut the pipe or, in other words, the pressure tapping has been completed.
Figure 5:
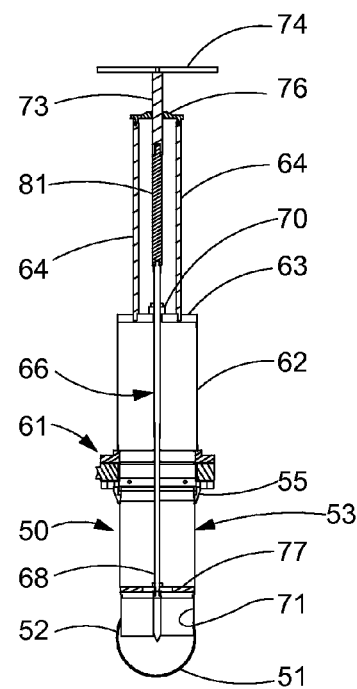
FIG. 5 is an end sectional view of the assembly after the pressure tapping and removal of the actuator has been completed.

In FIGS. 4-5, the pressure tapping operation has been completed as the cylindrical cutting device 71 has cut through the pipe 51. Comparing FIGS. 4 and 5, in FIG. 5, the actuator 65 has been removed and a longer extension shaft 81 has been inserted between the shaft 66 and shaft 73. At this point, the cylindrical cutting device 71 may be pulled upward through the temporary valve 61 into the installation housing 62. The temporary valve 61 may then be closed or the plate 69 moved to the right from the perspective of FIG. 4 to isolate the cylindrical cutting device 71 in the installation housing 62 thereby exposing the housing section 53 of the gate valve housing 50 to the pressure flowing through the pipe 51.

Figure 6:
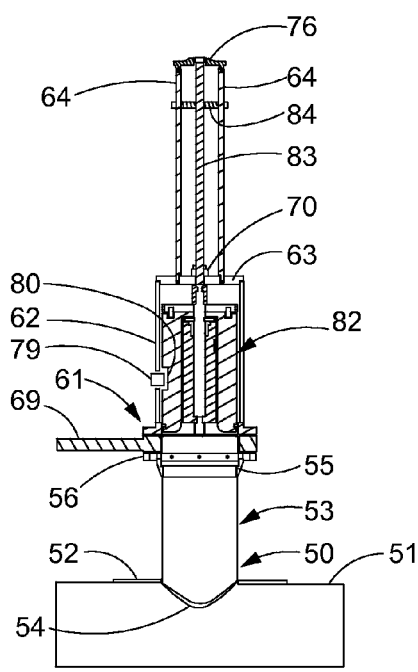
FIG. 6 illustrates the installation assembly after the cylindrical cutting device and actuator have been removed and a gate valve has been installed and aligned correctly in the installation housing.
Figure 7:
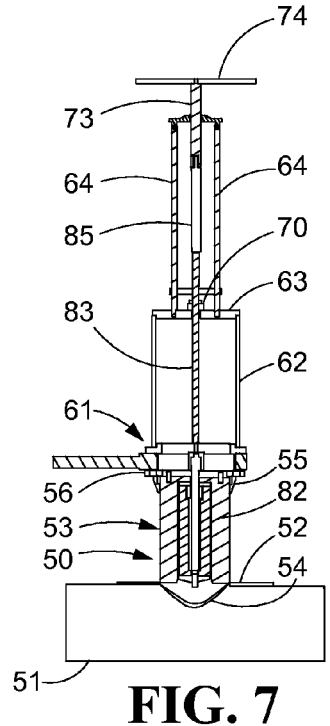
FIG. 7 is another sectional view of the assembly as shown in FIG. 6 with the gate valve having been moved from the installation housing, through the temporary valve and into the gate valve housing disposed above the cut section of the pipe. From the position shown in FIG. 7, the temporary valve and installation housing may be removed, a valve housing top plate may be installed and the gate valve may be moved between open and closed positions as illustrated in FIGS. 10 and 12.
Figure 29:
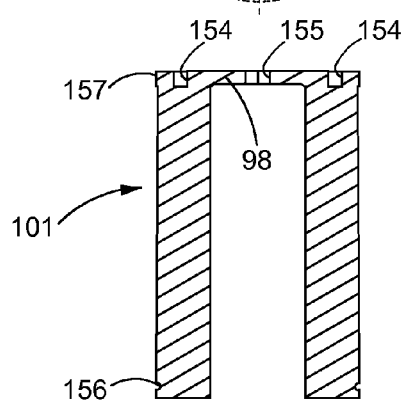

With the temporary valve 61 in a closed position, the installation housing 62 and cutting device 71 may be safely removed and the cylindrical cutting device 71 and associated shafts 66, 81, 73 and handle 74 may be replaced with the gate valve 82 which is coupled to a shaft 83 as shown in FIG. 6. The actuator 65 and plate 75 have been removed in favor of the guide plate 84. The shaft 83 passes through the packing nut 70 and cover 63 of the installation housing 62. In FIG. 6, the temporary valve 61 is shown in an open position thereby enabling the gate valve 82 to be moved from the position shown in FIG. 6 to the position shown in FIG. 7 where the gate valve 82 is sealably inserted into the housing section 53 of the gate valve housing 50. In one embodiment, the installation housing 62 and gate valve 82 are equipped with an alignment mechanism that ensures that the gate valve 82 is positioned in the correct orientation vis à vis the pipe 51. For example, the gate housing 101 (FIG. 29) may include a slot (not shown) for accommodating a pin (not shown) to ensure that the gate 103 (FIG. 33) is oriented perpendicular to the flow through the pressurized pipe 51. Such a pin 79 and slot 80 are shown schematically in FIG. 6.

By providing a gate valve 82 that may sealably engage the housing section 53 of the gate valve housing 50, the temporary valve 61 does not need to be closed in order to remove the installation housing 62 and the components disposed above the installation housing 62. In other words, in FIG. 7, the temporary valve 61, installation housing 62, guide posts 64, shafts 83, 85, 73 and handle 74 may be removed after pins or other types of fasteners are used to secure the gate valve 82 to the flange 56 in the correct orientation. As explained below, the gate valve 82 will be the primary seal between the pipe 51 and the distal end 55 of the housing section 53 of the gate valve housing 50.

Figure 8:
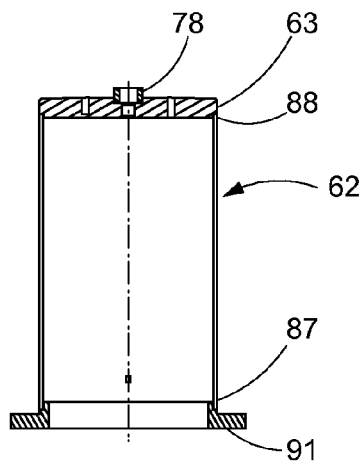
FIG. 8 is a sectional view of the installation housing.
Figure 9:
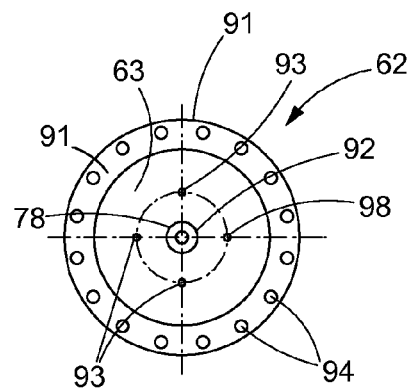
FIG. 9 is a top plan view of the installation housing.

Details of the installation housing 62 are shown in FIGS. 8-9. The installation housing 62 includes a proximal end 87 and a distal end 88. The distal end 88 is coupled to the cover 63. The proximal end 87 is coupled to or includes a flange 91 which is used to couple the installation housing 62 to the temporary valve 61. A top view of the cover 63, flange 91 and central opening 92 through which various shafts used for cutting the pipe 51 or installing the gate valve 82 may pass. FIG. 9 also illustrates a threaded fitting 78 for receiving the packing nut 70 (FIGS. 4-7) and the holes 93 that may be used to couple the guide posts 64 to the cover 63. The holes 94 are used to couple the flange 91 to the temporary valve 61. The hole 98 serves as a port for injecting pressurized air above the gate valve 82 as it is lowered or for releasing pressure as the cylindrical cutting device 71 or gate valve 82 is raised back into the installation housing 62.

Figure 10:
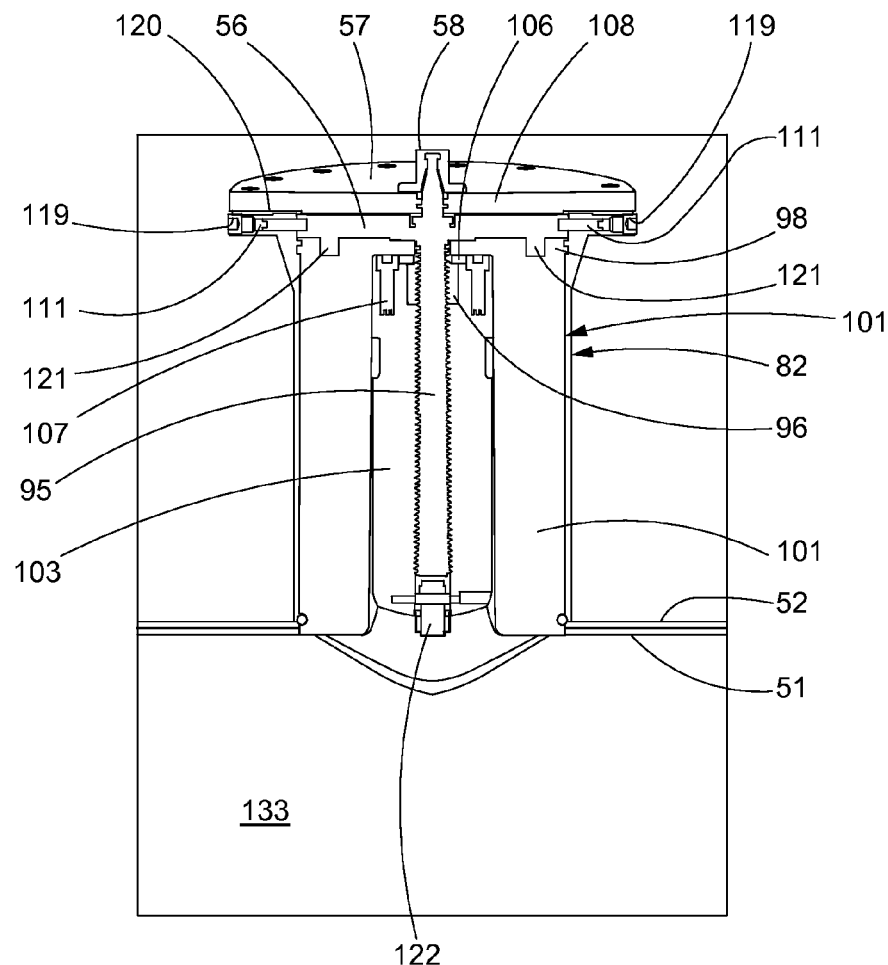
FIG. 10 is a sectional view of the gate valve in an open position after the gate valve installation has been completed.
Figure 11:
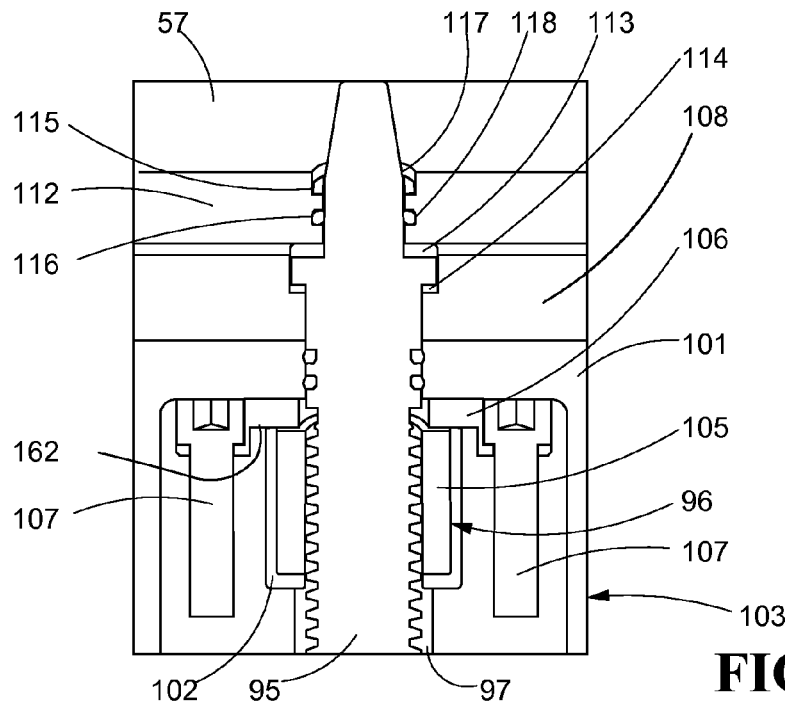
FIG. 11 is an enlarged partial sectional view as shown in FIG. 10, particularly illustrating the relationship between the feed screw, the stem nut, the retention plate and the enlarged opening of the hole through which the feed screw passes.
Figure 12:
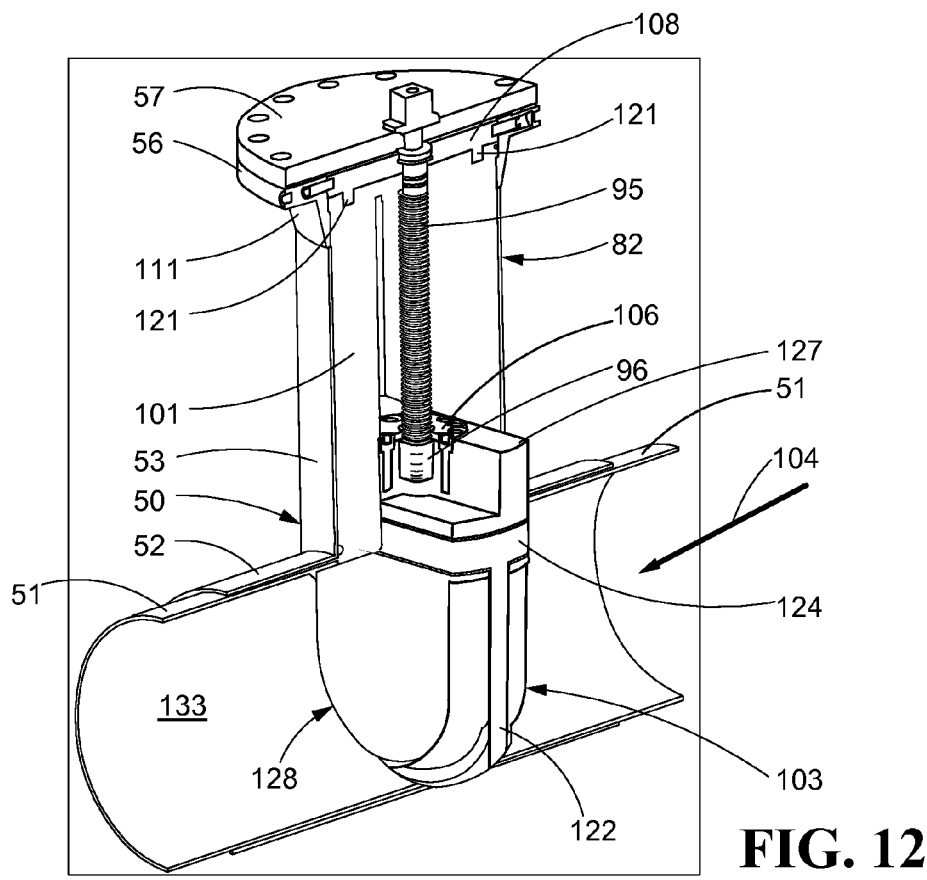
FIG. 12 is a perspective and sectional view of the gate valve assembly shown in FIGS. 10-11, but with the gate valve in a closed position.
Figure 25:
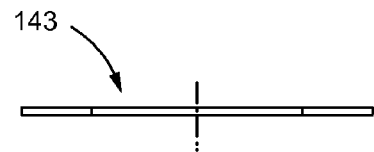
FIGS. 24 and 25 are front and top views of a shield that may be mounted on either side of the seal shown in FIGS. 22-23.
Figure 30:
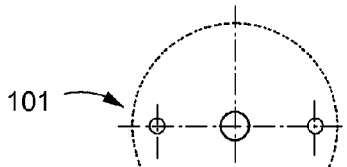
FIGS. 29-30 are sectional and top views of the gate housing.

FIGS. 10-12 illustrate the valve 82 in both open (FIG. 10) and closed (FIG. 12) positions. FIG. 10 illustrates the use of pins 111 and threaded caps 119 to secure the gate housing 101 in the correct orientation achieved in the installation housing 62 as shown in FIG. 6. FIG. 10 also illustrates the use of a gasket 120 between the flange 56 and the valve housing top plate 57. Referring to FIG. 11, to lower the valve 82 from the open position shown in FIGS. 10-11 to the closed position shown in FIG. 12, the feed screw 95 is rotated. The feed screw 95 is threadably coupled to the stem nut 96. The feed screw 95 passes through a hole 97 that passes through a top 98 of the gate 103 which will be described in greater detail below in connection with FIGS. 29-30 and 33. The hole 97 includes an enlarged opening 102 that provides some clearance between the stem nut 96 and the gate 103. This additional clearance provided by the opening 102 and the size of the stem nut 96 enables the feed screw 95 to be deflected by the pressure of the fluid in the pipe 51.

Specifically, referring to FIG. 12, if fluid pressure is pressing against the gate 103 of the gate valve 82 in the direction of the arrow 104 when the gate valve 82 is in the closed position as shown in FIG. 12, the feed screw 95 and stem nut 96 would move to the left from the perspective of FIG. 11. With the additional clearance provided by the enlarged opening 102, the stem nut 96 will avoid contact with the gate 103 unless the pressure in the pipe 51 is greater than the valve 82 is designed for. While the enlarged opening 102 provides clearance between the stem nut 96 and the gate housing 101, the stem nut 96 is not free to rotate within the opening 102. Instead, as shown in FIGS. 14-15, the stem nut 96 includes a rectangular body 105 and therefore the opening 102 may be shaped to prevent rotation of the stem nut 96 while still providing clearance between the body 105 of the stem nut 96 and the gate 103. Further, to retain the stem nut 96 within the opening 102, a retention plate 106 is utilized that at least partially covers the opening 102 and prevents upward movement of the stem nut 96 past the retention plate 106 as shown in FIG. 11. The retention plate 106 is secured to the gate housing 101 via the fasteners 107. A recess 162 in the underside of the retention plate 106 may also be shaped to prevent rotation of the stem nut 96.

Still referring to FIGS. 10-12, the gate housing 101 is covered by a gate assembly top plate 108. The gate assembly top plate 108 is secured to the flange 56 with pins or fasteners 111. The gate assembly top plate 108 may be covered by an additional valve housing cover plate 57. Still referring to FIG. 11, thrust washers 113, 114 may be utilized to limit the friction between the feed screw 95 and the gate assembly top plate 108. The valve housing cover plate 57 may include recesses 115, 116 for the placement of seals 117, 118. As shown in FIGS. 10 and 12, the gate assembly top plate 108 includes a plurality of downwardly extending pegs 121 that prevent rotation of the gate housing 101 with respect to the gate assembly top plate 108 which, in turn, is prevented from rotation by way of the pins 111 that secure the gate assembly top plate 108 to the flange 56.

As also shown in FIGS. 10 and 12, the gate 103 is equipped with a seal 122 that is also illustrated in FIGS. 22-23. The seal 122 is accommodated in a groove 123 disposed in the gate 103 as better illustrated in FIGS. 18-20. In addition to the seal 122, a circumferential seal 124 is also coupled to the gate 103 and is accommodated in the groove 125 as shown in FIGS. 18-19 and 21.

One advantage of the design of the gate valve 82 as shown in FIGS. 10-12 is the shape of the gate 103. Specifically, the gate 103 is shaped and includes a rectangular top 127 (see FIG. 12). In contrast, currently available designs typically to not include a separate gate housing 101 and gate 103. By providing a gate valve 82 design that includes a slidable gate 103 disposed within a stationary gate housing 101, the top surface 127 of the gate 103 has been reduced thereby requiring less operating torque to open and close the valve 82. By way of example only, the operating torque to close the gate valve 82 made in accordance with this disclosure may be reduced. Further, the operating torque to open the gate valve 82 made in accordance with this disclosure may also be reduced. Thus, the gate valve 82 disclosed herein is easier to install but also easier and safer to open and close as substantially less operating torque is required. Further, the operating torques of the valve 82 disclosed herein may be lower due to the clearance provided by the opening 102 and the stem nut 96 which avoids binding of the threads of the stem nut 96 and feed screw 95.

FIG. 13 illustrates the feed screw 95 which includes a distal end 131 that is suitably shaped to be engaged by an actuator through the operating nut 58 (FIG. 1) and a distal end 132. The feed screw 95 is threaded as shown schematically in FIG. 13. Because of the reduced surface area of the top 127 of the gate 103 and the clearance 102 between the stem nut 96 and gate 103, less operating torque is required to raise and lower the seal assembly 128. As such, threads with smaller major and minor diameters may be utilized which also contributes to the reduction in the required operating torque to open and close the valve 82. Further, the thrust washers 113, 114 are preferably fabricated from a durable polymeric material or non-metallic material to reduce the friction between the feed screw 95, the gate assembly top plate 108 and the valve housing cover plate 57, which further contributes to the reduction of the required operating torque required to raise and lower the seal assembly 128 or open and close the valve 82.

FIGS. 16-17 illustrate details of the gate assembly top plate 108 which includes peripheral holes or openings 134 for receiving the pins 111 that extend through the flange 56 (see also FIGS. 10 and 12) as well as openings 135 along the underside of the gate assembly top plate 108 for accommodating pegs or pins 121 to secure the gate housing 101 to the gate assembly top plate 108 which, in turn, is secured to the flange 56 as shown in FIGS. 10 and 12.

Details of the gate 103 are shown in FIGS. 18-21. The feed screw 95 is accommodated in the hole 97 which includes the shaped opening 102 that accommodates the stem nut 96 as discussed above. A recess 136 is provided at the top 127 of the gate 103 for accommodating the retention plate 106. As noted above, the slot or groove 123 accommodates the bottom seal 122, which is further illustrated in FIGS. 22-23. The surfaces shown at 126 may, in conjuction with the slots 130 in the seal 122 (FIG. 22) may engage cams (not shown) that push the side portions 149 of the seal 122 outward against the inside surface of the pipe 51 when the valve 82 is closed.

Figure 24:
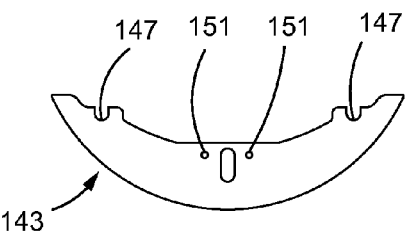
Figure 26:
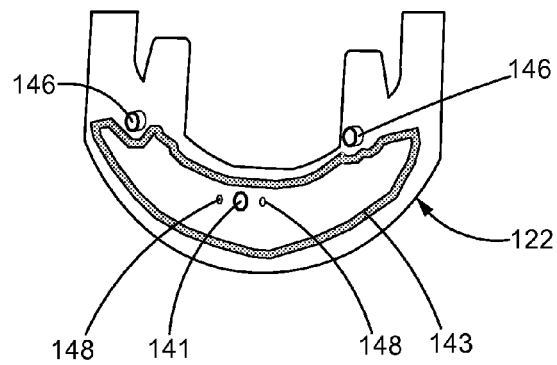
FIG. 26 is a perspective view of a seal as shown in FIGS. 22-23 with a shield as shown in FIGS. 24-25 mounted thereon.
Figure 28:
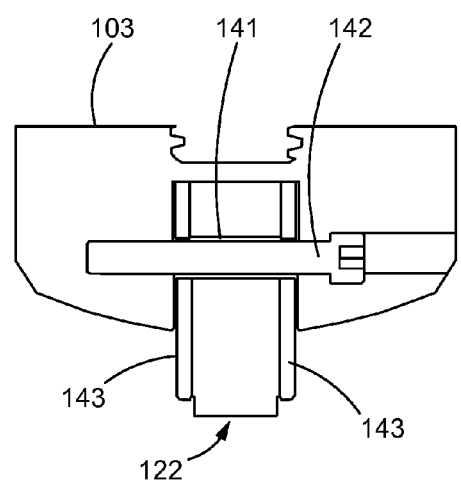
FIG. 28 is a partial sectional view of the seal assembly shown in FIG. 27, illustrating the means for coupling the bottom portion of the seal to the gate.

Turning to FIGS. 22-23, the seal 122 includes a bottom center hole 138 that is also lined with a metallic sleeve 141 that is shown in FIGS. 26 and 28. The sleeve 141 accommodates a fastener 142 shown in FIG. 28 that secures the seal 122 to the gate 103 and also secures a pair of shields 143 on either side of the bottom portion 144 of the seal 122. Further, referring to FIGS. 22 and 24-26, the holes may also be lined with a metallic sleeve 146 as shown in FIG. 26. The sleeves 146 are received in the slots 147 of the shields 143 (FIG. 24) when the seal 122 is pressed against the inside surface 133 of the pipe 51 to such an extent that the polymeric seal 122 is compressed thereby pushing the shields 143 in an upward direction towards the metallic sleeves 146 shown in FIG. 26. Finally, as also shown in FIG. 26, the shields 143 are secured to the seal 122 with two additional pins 148 that extend through the holes 151 of the shields (FIG. 24) and the holes 152 in the seal 122 (FIG. 22). The two pins 148 contribute to returning the shields 143 to their original position on the seal 122 after the seal 122 has been compressed against the inside surface 133 of the pipe 51.

Figure 27:
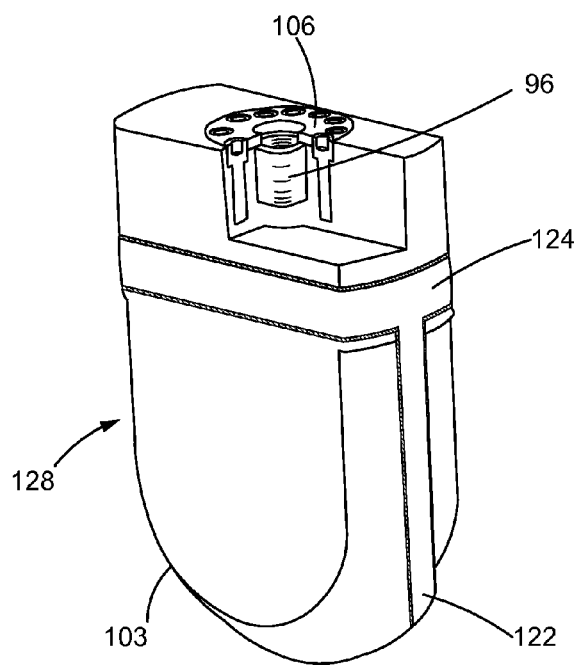
FIG. 27 is a perspective and sectional view of the seal assembly, particularly illustrating the retention plate, stem nut, gate and seals.

Turning to FIG. 27, an assembled seal assembly 128 is shown with the gate 103, the bottom seal 122, the circumferential seal 124, the stem nut 96, and the retention plate 106. The seal assembly 128 fits within the gate housing 101 shown in FIGS. 29-30. The recesses 154 accommodate the pegs 121 (see FIG. 12) and the central opening 155 accommodates the feed screw 95. The gate housing 101 also includes a lower recess 156 for accommodating a seal 164, that with the seal 124 of the gate 103, provides a seal between the gate housing 101/gate 103 and the housing section 53 of the gate valve housing 50 when the gate valve 82 is in the closed position. The upper recess 157 also accommodates a seal 165 such as an O-ring 165 (FIG. 30) that provides a seal between the gate housing 101 and the inside surface of the housing section 53 of the gate valve housing 50. The seal 165 enables the temporary valve 61, installation housing 62, etc. to be safely removed when the gate valve 82 is in the position shown in FIG. 7.

Figure 31:
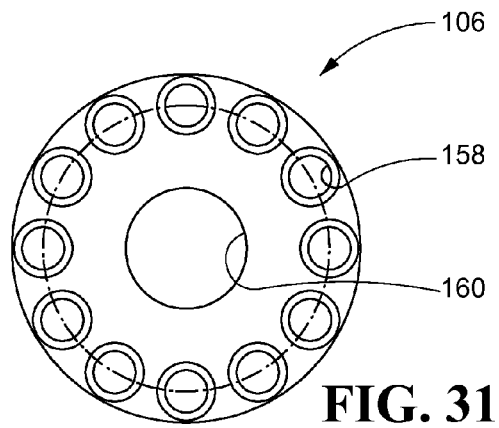
FIGS. 31-32 are top and side sectional views of the retention plate.
Figure 32:
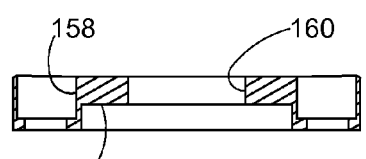

Details of the retention plate 106 are shown in FIGS. 31-32. The holes 158 are used to accommodate fasteners for securing the retention plate 106 to the top 127 of the gate 103 and the central opening 160 accommodates the feed screw 95. The recess 162 accommodates a top portion of the stem nut 96 and may optionally be used to prevent rotation of the stem nut 96 in addition to or instead of using the geometry of the opening 102 (FIG. 11).

Figure 33:
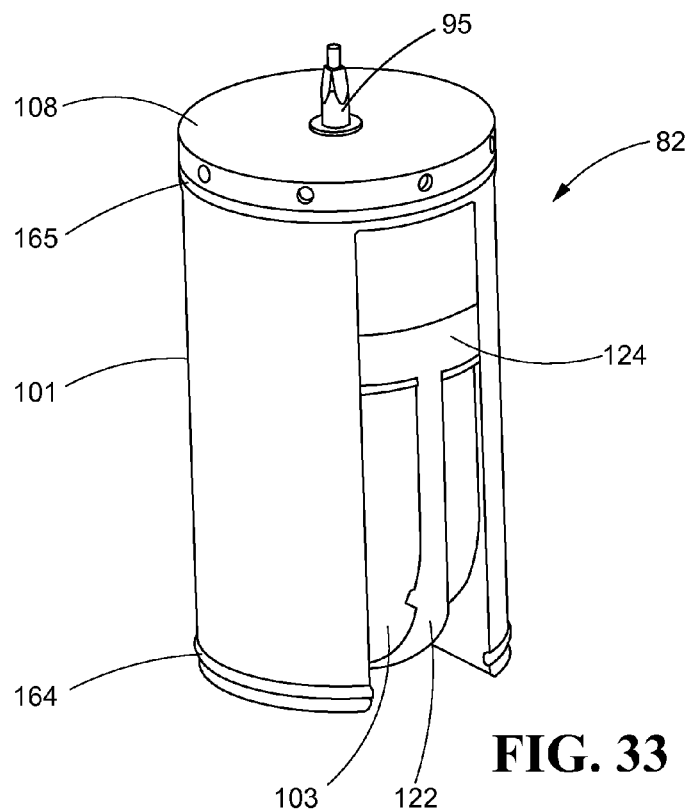
FIG. 33 is a perspective view of an assembled gate valve including the gate assembly top plate featuring circumferential holes for coupling the gate assembly top plate to a flange disposed at a distal end of the housing portion of the gate valve housing shown in FIG. 1.

Finally, an assembled gate valve 82 is shown in FIG. 33 in its retracted or closed position. An O-ring 165 is shown that is accommodated in the recess 157 of FIG. 29 that may provide a seal between the gate valve 82 and the housing section 53 of the gate valve housing 50 when the gate valve 82 is in the open position as shown in FIG. 10 thereby enabling the temporary valve 61 and/or valve housing top plate 57 to be safely removed as discussed about even through the valve 82 is open. Also, as noted above, the seals 164 and 124 may provide a seal against the housing section 53 when the valve 82 is in the closed position as shown in FIG. 12.

INDUSTRIAL APPLICABILITY

An improved valve that may be installed in a pressurized pipe or conduit is disclosed. The pressure rating of the disclosed valve is improved by the gate design which provides an improved means for securing the seal to the gate and also provides for shields that help strengthen the seal and help return the seal to its relaxed position after the seal has been compressed in the closed position of the valve. Further, providing a gap or clearance between the stem nut and the gate permits some deflection of the gate without the stem nut engaging the gate, acting as a fulcrum and thereby increasing thread friction and the operating torque necessary to open and close the valve. Still further, the disclosed gate valve includes a slidable gate disposed within a gate housing. Because the entire gate housing is not lowered or raised during the opening or closing of the valve, only a smaller surface area of the top of the gate needs to be pressed downward or lifted upward during opening and closing. As a result of this smaller surface area, less operating torque is required to open and close the valve.

While only certain embodiments have been set forth, alternatives and modifications will be apparent from the above description to those skilled in the art. These and other alternatives are considered equivalents and within the spirit and scope of this disclosure and the appended claims.

What is claimed:

1. A gate valve comprising:
 a cylindrical gate housing that is solid except for a slot extending through a bottom of the cylindrical gate housing and towards a top of the cylindrical gate housing;
 the slot accommodating a seal assembly, the seal assembly including a gate having a top and a bottom, the top of the gate including a hole that passes through the top of the gate for receiving a feed screw, the hole including a shaped opening for loosely accommodating a stern nut, the hole also including a recess disposed in the top of the gate for accommodating a retention plate that is connected to the top of the gate, the feed screw passing through the retention plate and the recess, the shaped opening and the stem nut and into the hole, the feed screw threadably engaging the stem nut, the shaped opening providing a gap between the gate and the stem nut but preventing rotation of the stem nut within the shaped opening;

the top of the gate being connected to a retention plate through which the feed screw passes, the retention plate also at least partially covering the shaped opening for retaining the stem nut within the shaped opening;

the bottom of the gate including a groove for accommodating a seal; and wherein rotation of the feed screw causing extension of the seal assembly out of the slot or retraction of the seal assembly into the slot.

2. The gate valve of claim 1 wherein the gate includes a curved bottom and a flat top disposed between and connected to a pair of end walls, the groove extending around the curved bottom and at least partially along each end wall.

3. The gate valve of claim 2 wherein the seal includes a bottom portion disposed between a pair of end portions, the bottom portion extending beyond the bottom of the gate and the end portions extending beyond the end walls when the seal is disposed in the groove.

4. The gate valve of claim 2 wherein the bottom portion of the seal is connected to at least one shield.

5. The gate valve of claim 3 wherein the bottom portion of the seal is sandwiched between a pair of shields.

6. The gate valve of claim 1 further including a gate valve housing including a base for engaging a pipe, the base connected to a housing section that extends perpendicularly away from the pipe, the housing section accommodating the gate housing and seal assembly when the seal assembly is retracted into the slot of the gate housing.

7. A kit for installing a gate valve into a pressurized pipe, the kit comprising:

a gate valve housing including a base for engaging the pipe, the base connected to a proximal end of a housing section that extends at least substantially perpendicularly away from the pipe and that terminates at an open distal end;

a temporary valve detachably connected to the distal end of the housing section;

an installation housing having a proximal end connected to the temporary valve opposite the distal end of the housing section, the installation housing including an open distal end, the open distal end being connected to a cover, the cover including a central opening that sealably accommodates a shaft;

the shaft including a proximal end connected to a cylindrical butting blade and a distal end connected to an actuator;

the gate valve including a cylindrical gate housing that is solid except for a slot extending through a bottom of the cylindrical gate housing towards a top of the cylindrical gate housing, the slot accommodating a seal assembly, the seal assembly including a gate having a top and a bottom, the top of the gate including a hole that passes through the top for receiving a feed screw, the hole including a shaped opening for loosely accommodating a stem nut, the hole also including a recess disposed in the top of the gate for accommodating a retention plate that is connected to the top of the gate, the feed screw passing through the retention plate and the recess, the shaped opening and the stem nut and into the hole, the feed screw being threadably engaged with the stem nut, the shaped opening providing a gap between the gate and the stem nut but preventing rotation of the stem nut within the shaped opening, the top of the gate being connected to a retention plate through which the feed screw passes, the retention plate also at least partially covering the shaped opening for retaining the stein nut within the shaped opening, the bottom of the gate including a groove for accommodating a seal, the top of the gate including another groove for accommodating another seal.

8. The kit of claim 7 wherein the gate includes a curved bottom and a flat top disposed between and connected to a pair of end walls, the groove extending around the curved bottom and at least partially along each end wall.

9. The kit of claim 8 wherein the seal includes a bottom portion disposed between a pair of end portions, the bottom portion extending beyond the bottom of the gate and the end portions extending beyond the end walls when the seal is disposed in the groove.

10. The kit of claim 9 wherein the bottom portion of the seal is connected to at least one shield.

11. The kit of claim 9 wherein the bottom portion of the seal is sandwiched between a pair of shields.

12. The kit of claim 7 wherein the cylindrical gate housing includes a circumferential seal for sealably engaging the gate valve housing.

13. The kit of claim 7 wherein the actuator is supported above the cover of the installation housing by a plurality of guide posts.

14. The kit of claim 7 wherein the temporary valve is a knife gate valve.

15. The kit of claim 7 further including a gate valve housing top plate for connection to the distal end of the housing section of the gate valve housing, the gate valve housing top plate including an opening through which a portion of the feed screw may sealably pass.

16. A method for installing a gate valve in a pressurized pipe, the method comprising:

providing the gate valve housing, temporary valve, installation housing and gate valve of claim 7;

coupling the gate valve housing to the pipe, the gate valve housing including a distal end;

coupling the temporary valve to the distal end of the gate valve housing;

coupling a cylindrical cutting device to a proximal end of a shaft;

passing a distal end of the shaft through a central opening of a cover of an installation housing and placing the cylindrical cutting device inside the installation housing;

coupling a proximal end of an installation housing to the temporary valve opposite the distal end of the gate valve housing;

opening the temporary valve and moving the cylindrical cutting device into contact with the pipe;

rotating the shaft and cylindrical cutting device and cutting an opening in the pipe;

retracting the cylindrical cutting device through the temporary valve and into the installation housing;

closing the temporary valve;

removing the cylindrical cutting device and the installation housing from the temporary valve;

coupling the gate valve to another shaft;

placing the gate valve inside the installation housing and passing the shaft through the central opening of the cover of the installation housing;

coupling the installation housing to the temporary valve;

opening the temporary valve;

passing the gate valve through the temporary valve and into the gate valve housing, the gate valve sealably engaging the gate valve housing;

removing the temporary valve and the installation housing;

coupling a valve housing top plate to the distal end of the gate valve housing.

17. The method of claim 16 further including aligning the gate valve in the installation housing to the gate is perpendicular to an axis of the pipe.

18. The method of claim 17 further including securing the gate housing to the housing section with the gate oriented perpendicular to the axis of the pipe.

19. The method of claim 17 further including providing a seal between the gate valve and the gate housing when the gate valve is in a closed position.

20. The method of claim 17 further including providing a seal between the gate valve and the gate housing when the gate valve is in an open position.

* * * * *